United States Patent
Aubert (10) Patent No.: US 7,529,607 B2
(45) Date of Patent: May 5, 2009

(54) METHOD FOR CONTROLLING SELECTION OF AN AUTOMATIC TRANSMISSION GEAR RATIO

(75) Inventor: Olivier Aubert, Chaville (FR)

(73) Assignee: Renault S.A.S., Boulogne Billancourt (FR)

( * ) Notice: Subject to any disclaimer, the term of this patent is extended or adjusted under 35 U.S.C. 154(b) by 22 days.

(21) Appl. No.: 10/535,913

(22) PCT Filed: Nov. 18, 2003

(86) PCT No.: PCT/FR03/03412

§ 371 (c)(1),
(2), (4) Date: Jan. 11, 2006

(87) PCT Pub. No.: WO2004/048819

PCT Pub. Date: Jun. 10, 2004

(65) Prior Publication Data

US 2006/0155450 A1    Jul. 13, 2006

(30) Foreign Application Priority Data

Nov. 21, 2002  (FR)  .................................. 02 14559

(51) Int. Cl.
   *G06F 17/00*   (2006.01)
   *B60T 8/32*    (2006.01)
   *B60K 31/00*   (2006.01)

(52) U.S. Cl. .............................. 701/55; 701/54; 701/56; 701/57; 701/62; 701/64; 701/93; 701/94; 701/95; 477/34; 477/42; 477/43; 477/68; 477/71; 477/79; 477/80; 477/84; 477/85; 477/91; 903/917; 903/918; 903/919

(58) Field of Classification Search ............. 701/51–65, 701/84–87, 93–95; 477/34–43, 68–91; 903/917–919, 903/923
See application file for complete search history.

(56) References Cited

U.S. PATENT DOCUMENTS

| 4,421,192 | A |   | 12/1983 | Ito |
| 4,697,478 | A |   | 10/1987 | Mastumoto |
| 4,709,595 | A |   | 12/1987 | Hayama |
| 4,731,727 | A | * | 3/1988  | Rauch et al. ................. 701/123 |
| 4,845,621 | A | * | 7/1989  | Kawata et al. ................. 701/95 |
| 5,012,419 | A |   | 4/1991  | Yamamoto |
| 5,035,157 | A | * | 7/1991  | Aoki et al. ................... 477/128 |
| 5,062,049 | A | * | 10/1991 | Taylor ......................... 701/53 |

(Continued)

FOREIGN PATENT DOCUMENTS

DE    101 06 935    8/2002

(Continued)

*Primary Examiner*—Jack W. Keith
*Assistant Examiner*—Chuong P Nguyen
(74) *Attorney, Agent, or Firm*—Oblon, Spivak, McClelland, Maier & Neustadt, P.C.

(57) ABSTRACT

A method for controlling selection of an automatic transmission gear ratio with staged ratios or constant variation for a vehicle including a control for preventing/allowing extension of the gear ratio or for controlling a shortening the transmission gear ratio if, at a current engine speed, the power is insufficient for maintaining the vehicle speed. The method prevents extension of the transmission gear ratio if the power available after the extension is insufficient for maintaining the vehicle speed; otherwise allowing extension of the transmission gear ratio.

10 Claims, 6 Drawing Sheets

U.S. PATENT DOCUMENTS

| | | |
|---|---|---|
| 5,241,476 A | 8/1993 | Benford |
| 5,270,934 A | 12/1993 | Kobayashi |
| 5,319,555 A * | 6/1994 | Iwaki et al. .................... 701/57 |
| 5,568,748 A * | 10/1996 | Carlson et al. ............ 74/336 R |
| 5,738,605 A * | 4/1998 | Fliearman et al. ........... 477/108 |
| 6,044,317 A * | 3/2000 | Taffin .......................... 701/57 |
| 6,067,495 A | 5/2000 | Fliearman |
| 6,098,004 A * | 8/2000 | Grytzelius et al. ............ 701/55 |
| 6,549,840 B1 * | 4/2003 | Mikami et al. ................ 701/69 |
| 2002/0124830 A1 * | 9/2002 | Ephraim et al. ............. 123/350 |

FOREIGN PATENT DOCUMENTS

| | | |
|---|---|---|
| EP | 0 142 046 | 5/1985 |
| EP | 1 248 021 | 10/2002 |
| FR | 2 461 169 | 1/1981 |
| FR | 2737761 | 2/1997 |

\* cited by examiner

METHOD FOR CONTROLLING SELECTION OF AN AUTOMATIC TRANSMISSION GEAR RATIO

BACKGROUND OF THE INVENTION

The present invention relates to a method for controlling the selection of the gear reduction ratio of a transmission for a vehicle equipped with a stepped-ratio or continuously variable automatic transmission, especially for operation of the said vehicle with a speed governor or limiter. It is known that specific strategies can be used to control the selection of the transmission ratio of a stepped-ratio automatic transmission in order to suppress the instabilities of automatic gearboxes known as the hunting phenomenon. This phenomenon is manifested by an excessive frequency of ratio changes from one ratio to a higher ratio and vice versa, when the resisting load exerted on the vehicle becomes large (inclined roadway, strong wind, etc.). In fact, when the resisting load increases, as in the case when the vehicle encounters an uphill stretch, the said vehicle tends to slow down, and the operator presses on the accelerator pedal in order to compensate for this loss of speed. When the operator's demand (depression of the accelerator pedal) exceeds a certain threshold, the automatic management system of the gearbox initiates a downshift to a shorter ratio. This downshift permits the vehicle to deliver sufficient thrust to accelerate, and the operator tends to raise his foot from the accelerator pedal once the desired speed has been reached.

Once the vehicle has regained its initial speed and the operator has raised his foot from the accelerator pedal, the automatic management system of the gearbox initiates a shift to the higher ratio, re-establishing the initial conditions that are going to lead to a loss of vehicle speed (since the resisting load has not decreased). Once again, the operator will attempt to compensate for this loss of speed, a shift to the lower ratio will be initiated and so on . . . This phenomenon of oscillation between two gear reduction ratios of the transmission also occurs when the vehicle speed is controlled by an automatic speed governor, the said governor exerting pilot control over the same control means as the operator (degree of opening of the intake butterfly valve, for example, in the case of controlled ignition engines) to perform its speed-governing function.

In order to eliminate this phenomenon of ratio hunting, there have been proposed, especially in connection with automatic speed-governing systems, solutions to take control of the automatic management system of the gearbox, and in particular to force downshifts or to prevent lengthening of ratios as a function of specific criteria. For example, U.S. Pat. Nos. 4,421,192 and 4,697,478, European Patent 142046 and U.S. Pat. Nos. 5,270,934 and 5,479,349 describe systems for governing the speed of a vehicle by using, for pilot control of stepped-ratio automatic transmissions, algorithms written specifically to eliminate the hunting phenomenon. These algorithms lead to forced initiation of a downshift (shift to a lower ratio) upon detection of a loss of vehicle speed compared with a given setpoint. Depending on the case, following such a forced downshift, the method consists in forcing the vehicle to remain in the lower ratio for a certain time after the vehicle has regained its setpoint speed (U.S. Pat. Nos. 4,421, 192 and 4,697,478), or in making the shift to the higher ratio contingent upon certain conditions. In the case of U.S. Pat. No. 5,479,349, the shift to the higher ratio is prevented as long as the absolute value of the speed difference and that of the current acceleration exceed predetermined values. In European Patent 142046, the lower ratio is maintained as long as the vehicle speed cannot be sustained without opening the air-intake butterfly valve beyond a predetermined limit. In U.S. Pat. No. 5,270,934, the condition for remaining in the lower ratio involves a predictive estimate, based on the control signal to open the butterfly valve, of the vehicle speed if the higher ratio were engaged.

The solutions for eliminating the hunting problem, as proposed in the aforesaid documents, are limited to the context of use of a speed-governing system, and they are not capable of anticipating sufficiently to avoid speed fluctuations during an increase of the resisting load exerted on the vehicle, downshifting being initiated only after detection of a substantial speed loss.

In addition, the case of use of a speed limiter poses a new problem compared with the prior art cited in the foregoing, in the sense that a speed limiter tends to function in a more extensive range of speed and ratios (approaching low speeds and low ratios) than does the speed governor, used mainly on the highway at high speed and at the highest transmission ratios.

U.S. Pat. Nos. 4,709,595 and 5,012,419 propose contrivances to attenuate the jolt associated with downshifting, but do not offer a solution to the need to anticipate the downshift.

U.S. Pat. No. 5,241,476, French Patent 2737761 and U.S. Pat. No. 5,738,605 describe techniques for elimination of the hunting problem based on inhibition of the shift to a higher ratio as a function of criteria based on a predictive estimate of the acceleration that the vehicle would experience at the higher ratio. These latter three documents certainly teach us elaborate methods for estimating the available acceleration at the higher ratio with good precision, but their teachings are limited to a strategy of inhibiting the shift to the higher ratio to eliminate the hunting problem, without giving any indication with regard to initiating the downshift.

For implementation of the methods cited in the foregoing, it is necessary to provide pilot-control means for inhibiting/authorizing the shift to a higher ratio or for forcing a downshift to the lower ratio. Solutions are proposed with regard to achieving such pilot-control means in connection with stepped-ratio transmissions.

SUMMARY OF THE INVENTION

The purpose of the present invention is to propose a method for controlling the selection of the gear reduction ratio of an automatic transmission, permitting continuous adaptation of the gear reduction ratio to the variations of resisting load and eliminating the risks of hunting in all driving situations: at all speeds and at all ratios.

The invention also has the purpose of proposing a single physical strategy for authorizing/inhibiting lengthening of the transmission ratio and demanding shortening thereof if necessary, the said strategy being compatible with stepped-ratio or continuously variable transmissions.

Another purpose of the invention is to ensure selection of a transmission ratio that permits the operator, an automatic governor or a speed limiter to follow a target speed accurately without oscillations of the said transmission ratio.

To this end, the object of the present invention is a method for controlling the selection of the gear reduction ratio of a stepped-ratio or continuously variable automatic transmission for a vehicle, provided with pilot-control means for inhibiting/authorizing lengthening of the gear reduction ratio or for initiating shortening of the gear reduction ratio. According to the invention:

the current engine speed $N(r)$ is measured, the engine speed $N(r+)$ is determined that the vehicle engine would have if the gear reduction ratio of the said transmission were lengthened, causing the current gear reduction ratio r to shift to a higher ratio r+, a first threshold is determined for a variable representative of the minimum power that must be delivered by the motive power group to maintain a setpoint vehicle speed, the said power being increased by a margin ΔP−, a second threshold is determined for the same variable representative of the minimum power that must be delivered by the motive power group in transmission ratio r+ to maintain the setpoint vehicle speed, the said power being increased by a margin ΔP+, the first threshold being strictly lower than the second threshold, shortening of the gear reduction ratio of the transmission is demanded if the variable representative of the power that can be delivered by the motive power group at the current speed $N(r)$ is lower than the first threshold, lengthening of the transmission ratio of the transmission ratio is inhibited if the variable representative of the power that can be delivered by the motive power group at speed $N(r+)$ is lower than the second threshold, shifting from the current ratio r to the higher ratio r+ is authorized if the variable representative of the thrust that can be delivered by the motive power group at speed $N(r+)$ is higher than the said second threshold.

The method according to the invention ensures that the power that can be delivered by the motive power group at the current ratio is always higher than a threshold representative of the resisting load plus a margin, which makes it possible to ensure that a speed setpoint is maintained. This principle could be sufficient to eliminate the hunting problem that develops when the power available at the current ratio is insufficient to compensate for the resisting load. However, if the first and second thresholds were identical, oscillating ratio shifts could occur due to small fluctuations of the resisting load. This problem can be overcome by the functional hysteresis introduced by establishing different first and second thresholds.

Since the conditions that determine the downshift demand or the authorization of lengthening thereof are related to the current resisting load via the first and second thresholds, the control achieved by the method according to the invention in selection of the transmission ratio ensures that the gear reduction ratio will be more adequate for variations of the resisting load.

In addition, the method according to the invention makes it possible to anticipate the downshift sufficiently when the resisting load increases, since, as soon as the power that can be delivered by the motive power group falls to a value below the thrust that must be delivered to maintain a speed setpoint plus a margin, the said downshift is demanded. Thus the downshift is produced in a manner sufficiently anticipated to prevent any speed fluctuation due to an increase of the resisting load, and so the method according to the invention is particularly well adapted to the use of a speed governor.

The method according to the invention will be applicable to any system for controlling the transmission ratio of an automatic transmission managed by other selection algorithms, provided that pilot-control means capable of inhibiting/authorizing lengthening of the ratio and initiating shortening of the ratio are available. The constraints defined by the method according to the invention as described in the foregoing are applied in addition to the constraints or criteria derived from other strategies. In the case of continuously variable transmissions in particular, the downshift demand can be expressed in practice by a setpoint for minimum speed of rotation of the engine. It is sufficient to express the first threshold in the form of an engine speed, in order to obtain the value of the said setpoint directly. Thus not only is the method compatible with continuously variable transmissions, but also it is capable of directly determining a control parameter for its practical implementation in this case.

According to a first alternative version of the invention, the said powers that can be delivered by the motive power group at the current speed $N(r)$ and at the speed $N(r+)$ are the maximum powers that can be delivered by the motive power group at the speeds under consideration. As explained hereinafter, this alternative version makes it possible to simplify the estimate of the power that can be delivered by the motive power group at speeds $N(r)$ and $N(r+)$. In fact, a calculation of the power that can be delivered immediately by the motive power group at a ratio higher than the current ratio requires that the state of the engine power control at the instant of the shift of ratio be taken into account. In fact, at given engine speed, the driving power depends, for example, on the degree of opening of the intake butterfly valve (case of controlled-ignition engines) or on the fuel-injection conditions (case of diesel engines). However, it is not indispensable for proper functioning of the method to determine the immediate availability of the motive power group; instead, it can be replaced without problem by the value of the maximum power that can be delivered rapidly by the motive power group by means of an adjustment of the engine power control. This maximum power can be determined extremely simply from the single datum of an engine speed, for example by using a modeling of the characteristic curve of the motive power group to establish a correspondence between engine speed and maximum power.

The resisting load exerted on the vehicle can be expressed in different equivalent forms, such as the power, the torque or a longitudinal force. The availability of the motive power group can be expressed in the same way. This is why it will be possible to choose the variable representative of the powers taken into account for determination of the thresholds and powers that can be delivered by the motive power group from among the power, the torque or the longitudinal force.

The aforesaid modeling of the characteristic curve of the motive power group giving the evolution of the maximum power that can be delivered by the motive power group as a function of engine speed can be used to make engine-speed values NMIN− and NMIN+ correspond respectively to the first and to the second threshold. Since the thresholds are then expressed in the form of engine speed, they can be compared directly with the engine speeds $N(r)$ and $N(r+)$ in order to determine the conditions that demand the actions for controlling selection of the ratio (downshift demand, authorization/inhibition of lengthening of the ratio), the said comparison being equivalent to the comparison of the powers represented by the said thresholds with the maximum powers that can be delivered by the motive power group at speeds $N(r)$ and $N(r+)$. In this way there is defined a particular mode of use of the invention, in which the first threshold (NMIN−) and the second threshold (NMIN+) are expressed in the form of engine speeds by means of a modeling permitting establishment of a correspondence between the powers represented by the said first and second thresholds and the corresponding engine speeds, the said modeling being that of a characteristic curve of the motive power group giving the evolution of a variable representative of the maximum power that can be delivered by the said motive power group as a function of engine speed. Consequently:

shortening of the gear reduction ratio of the transmission is demanded if the current engine speed N(r) is below the said first threshold (NMIN−), lengthening of the transmission ratio of the transmission ratio is inhibited if the engine speed N(r+) is below the said second threshold (NMIN+), shifting from the current ratio r to the higher ratio r+ is authorized if the engine speed N(r+) is above the said second threshold (NMIN+).

To calculate the resisting load, it is possible to use, for example, modeling of the longitudinal dynamics of the vehicle expressed by relationship R1 below:

$$F_{GMP}+F_{freins}+F_{res}=MV\gamma \quad (R1)$$

where $F_{GMP}$, $F_{freins}$ and $F_{res}$ represent the longitudinal forces applied to the vehicle, $F_{GMP}$ being the force delivered by the motive power group, $F_{freins}$ the braking force produced by the brake system of the vehicle, and $F_{res}$ the force representative of the resisting load, MV being the mass of the vehicle and γ its current acceleration.

After transformation of this relationship, the longitudinal force $F_{res}$ can be expressed in the following form:

$$F_{res}=MV\gamma-F_{GMP}-F_{freins} \quad (R2)$$

This second relationship R2 clearly shows that it is sufficient that the calculation of the resisting load exerted on the vehicle (represented by the force $F_{res}$ in relationship R2), permitting the minimum power that must be delivered by the motive power group in order to maintain a speed setpoint to be determined, includes a step of calculation of the current thrust delivered by the motive power group (the said thrust being expressible in the form of a longitudinal force $F_{GMP}$), of the mass (MV) of the vehicle and of the acceleration (γ) of the vehicle. All that remains is to determine the power exerted by the brake system (this being zero when the brakes are not being used), represented in relationship R2 by the force $F_{freins}$.

Relationship R2 also shows that any error in estimation of the product of mass MV times acceleration γ or of the value of the braking force $F_{freins}$ directly affects the calculation of the resisting load. This is why the mass (MV) of the vehicle is advantageously determined by a dynamic estimate of the mass of the vehicle (as is described, for example, in the comments hereinafter relating to FIG. 1). Similarly, during braking phases, the calculation of the resisting load will advantageously include a step in which the value of the power produced by the brake system is determined, the said value being obtained from an information stream representative of the brake pressure and a model establishing a correspondence between the said pressure and the said braking power. In fact, such a method of determining the braking power makes it possible to obtain precise and reliable results. If necessary, it would be possible to estimate the braking force more roughly (for example, by assuming the force to be constant during braking actions).

In order to avoid any risk of error related to estimation of the braking power, it is possible to use a particular embodiment of the method according to the invention, characterized in that the calculation of the resisting load is suspended during braking phases.

It is useful to provide means for dynamically optimizing the functioning of the method according to the invention, for example by adjusting the value of margins ΔP+ and ΔP−. This is why it will be advantageously possible to determine margins ΔP+ and ΔP− by taking into account the current gear reduction ratio (r) of the transmission and/or a variable representative of the resisting load. However, to simplify implementation of the method according to the invention and to avoid the need to adjust two parameters, it will be possible to assign margin ΔP− a fixed value of zero and to choose a constant and strictly positive value for margin ΔP+.

BRIEF DESCRIPTION OF THE DRAWINGS

The invention will be better understood by referring to the description presented hereinafter by way of non-limitative example and to the attached drawings, wherein.

DETAILED DESCRIPTION OF THE INVENTION

Figure 1:
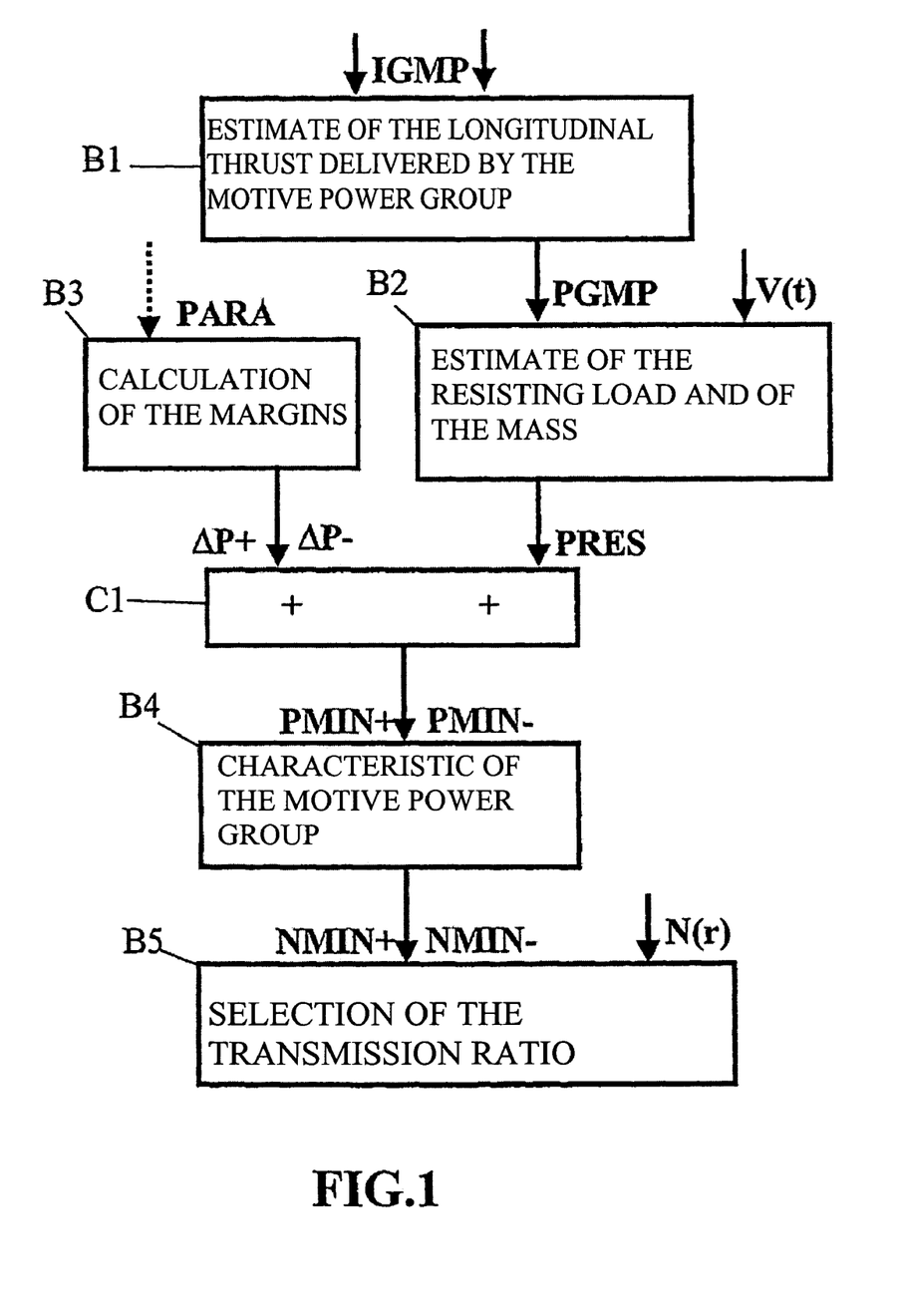
FIG. 1 is a diagram illustrating a practical example of the method according to the invention for controlling the selection of the transmission ratio.

In FIG. 1, the steps of the method according to the invention are represented in the form of functional blocks B1, B2, B3, C1, B4, B5, which are interconnected by arrows representing transfers of variables. The transfers of variables not originating from processing by one of the functional blocks but originating, for example, from sensors situated on the motive power group or from engine-control components are indicated by arrows whose beginning is not connected to any functional block.

The current control systems of both gasoline and diesel engines are capable of estimating the effective torque delivered by the engine by means of available sensors (speed, pressures, temperatures, air flow, etc.) and of actuator-control variables (injection time, turbo pilot control, variable intake or distribution).

Knowing the state of the transmission (gear reduction ratio) and of the coupling component (coupler, clutch or torque converter), it is possible, from the datum of the effective torque delivered by the engine, to estimate the participation of the motive power group in the longitudinal dynamics of the vehicle and to express it in the form of longitudinal thrust or of driving power delivered to the vehicle.

Thus for example, it will be possible to apply the function of block B1, which consists in estimating the longitudinal thrust delivered by the motive power group, on the basis of a set of information streams IGMP representing the functional state of the said motive power group.

The result of processing by block B1, expressed in the form of a power PGMP, for example, is transmitted to block B2. The function of block B2 is to estimate the mass MV of the vehicle and the resisting load PRES exerted on the said vehicle. This estimate requires the datum of the instantaneous speed V(t) of the vehicle at instant t, which datum can be delivered to block B2 by a speed sensor, for example. As regards calculation of the mass MV, it will be possible, for example, to use the method described in French Patent 2737761. This method consists in determining the variation ΔC of the wheel torque and the variation Δγ of the vehicle acceleration between two instants t and t'. The wheel torque is determined by the datum of the engine torque and of the gear reduction ratio of the transmission, the said engine torque being determined by means of the datum of the current engine speed and of the opening angle of the intake butterfly valve. The vehicle acceleration is determined by observing the variations of vehicle speed, the said speed being given by means of a speed sensor. When the two instants t and t' are sufficiently far apart for the torque and acceleration variations to be significant and sufficiently close together for the resisting loads to vary only slightly, the relationship between ΔC and Δγ is:

$$MV \cdot \Delta\gamma = \Delta C / \text{rayon} \tag{R3}$$

where rayon denotes the wheel radius.

From relationship (R3) it is possible to calculate the mass of the vehicle; in order to minimize the fluctuations of the estimate of MV, however, there is used a series of p torques (ΔC(i), Δγ(i)) determined at different instants, and the said series is mathematically processed to determine the value M with which the following mean square deviation J can be minimized:

$$J = E(i=1 \text{ to } i=p)(M \cdot \Delta\gamma(i) - \Delta C(i)/\text{rayon})^2$$

This value M is calculated each time that a new "good torque" (ΔC, Δγ) is determined (certain torques (ΔC, Δγ) that do not satisfy a series of criteria are eliminated), the said value M being used to supply a processing block that extracts a mean taking into account the previously calculated values of M. The mean resulting from this processing is representative, at each instant, of the mass of the vehicle, and so the method makes it possible to achieve a dynamic estimate of the mass of the vehicle. This method has been described by way of example; it will be possible to use other methods in order to implement the method according to the invention.

For identification of the resisting load, it will be possible, for example, to use the modeling of the longitudinal dynamic of the vehicle cited hereinabove, and recalled below:

$$F_{res} = MV\gamma - F_{GMP} - F_{freins} \tag{R2}$$

The acceleration γ can be determined, for example, by observing the speed V(t) as a function of time. The force $F_{GMP}$, representing the tractive force delivered by the motive power group, is obtained from the value of the power PGMP transmitted by block B1 by virtue of relationship R3 below:

$$F_{res} = PGMP/V(t) \tag{R3}$$

For determination of the braking force $F_{freins}$, it will be possible to use one of the methods cited in the foregoing. Once all parameters of the second term of relationship R2 have been identified, it will be possible to calculate the longitudinal force $F_{res}$ and express it in the form of a power PRES, representative of the resisting load, to be transmitted to block C1.

The purpose of block B3 is to determine the said margins ΔP+ and ΔP−. This determination can be achieved dynamically, if necessary as a function of parameters (symbolized by the dotted arrow with which the variable PARA is associated). It will also be possible, quite simply, to use fixed values, and in particular a value of zero for ΔP−, ΔP+ being strictly positive (for example, ΔP+=10 kW).

Calculation block C1 determines the value of the first and second thresholds from the values of ΔP+ and ΔP− delivered by block B3 and from the value of PRES delivered by block B2. In the chosen example, these thresholds are expressed in the form of power, and are calculated very easily as follows:

First threshold: PMIN−=PRES+ΔP−

Second threshold: PMIN+=PRES+ΔP+

Block B4 receives thresholds PMIN− and PMIN+ expressed in the form of power and, by a method according to that described hereinabove (use of modeling of a characteristic curve of the motive power group giving the evolution of the maximum power that can be delivered by the motive power group as a function of the engine speed), makes the engine speeds NMIN− and NMIN+ correspond to these values.

If it is wished to make the strategy function even in the cases in which the engine performances are reduced (for example, during operation at high elevations or at low temperatures), it will be possible to use more complete modeling of the characteristic of the motive power group, taking these factors into account.

The variables PGMP, PRES, ΔP+, ΔP−, PMIN+ and PMIN− transmitted between the different blocks can be expressed as power, as was suggested hereinabove, but they could also be expressed in other output variables of the motive power group, such as the wheel torque or the longitudinal tractive force, without compromising the principle of the invention.

Block B5 receives an information stream representative of the current engine speed N(r), where r is the current gear reduction ratio of the transmission. On the basis of this information stream, the value N(r+) is determined that the engine speed would assume if a shift were made to a higher gear reduction ratio r+, for example by using the formula below:

$$N(r+) = N(r) \cdot (r/r+)$$

In block B5, the selection of gear reduction ratio of the transmission is determined by comparison of the values N(r) and N(r+) with the values NMIN+ and NMIN− according to the rules already presented hereinabove:

if N(r) is strictly below NMIN−: shortening of the gear reduction ratio is initiated;

if N(r+) is strictly below NMIN+: lengthening of the gear reduction ratio is inhibited;

if N(r+) is greater than or equal to NMIN+: lengthening of the current transmission ratio r to the higher ratio r+ is authorized.

The constraints relating to the method that is the object of the invention, expressed above in the form of engine speeds, for a continuously variable transmission are expressed by a continuous variation of the transmission ratio, and for a stepped-ratio transmission, by an upshift as soon as the vehicle speed permits this to take place by recovering to an engine speed higher than NMIN+, and a downshift will be initiated as soon as the engine speed drops below NMIN−.

The functioning of the method according to the invention is illustrated by examples in FIGS. 2 to 6 described hereinafter, for the case of a stepped-ratio transmission. For these examples, the value of ΔP− has been set equal to zero (meaning that PRES=PMIN−) and that of ΔP+ equal to a constant (positive). On each of the figures there are shown five graphs representing the simultaneous evolution of the slope (PENTE), of the vehicle speed (VITESSE) of a variable (P) expressing the instantaneous availability of the motive power group (such as a power), of the engine speed (N) and of the gear reduction ratio (RAPPORT) as a function of time (t). These graphs make it possible to observe the result of the method according to the invention for selecting the transmission ratio, applied in different conceivable cases. The examples chosen are limited to the fourth and fifth ratio, but the results could be transposed to two other successive ratios.

Figure 2:
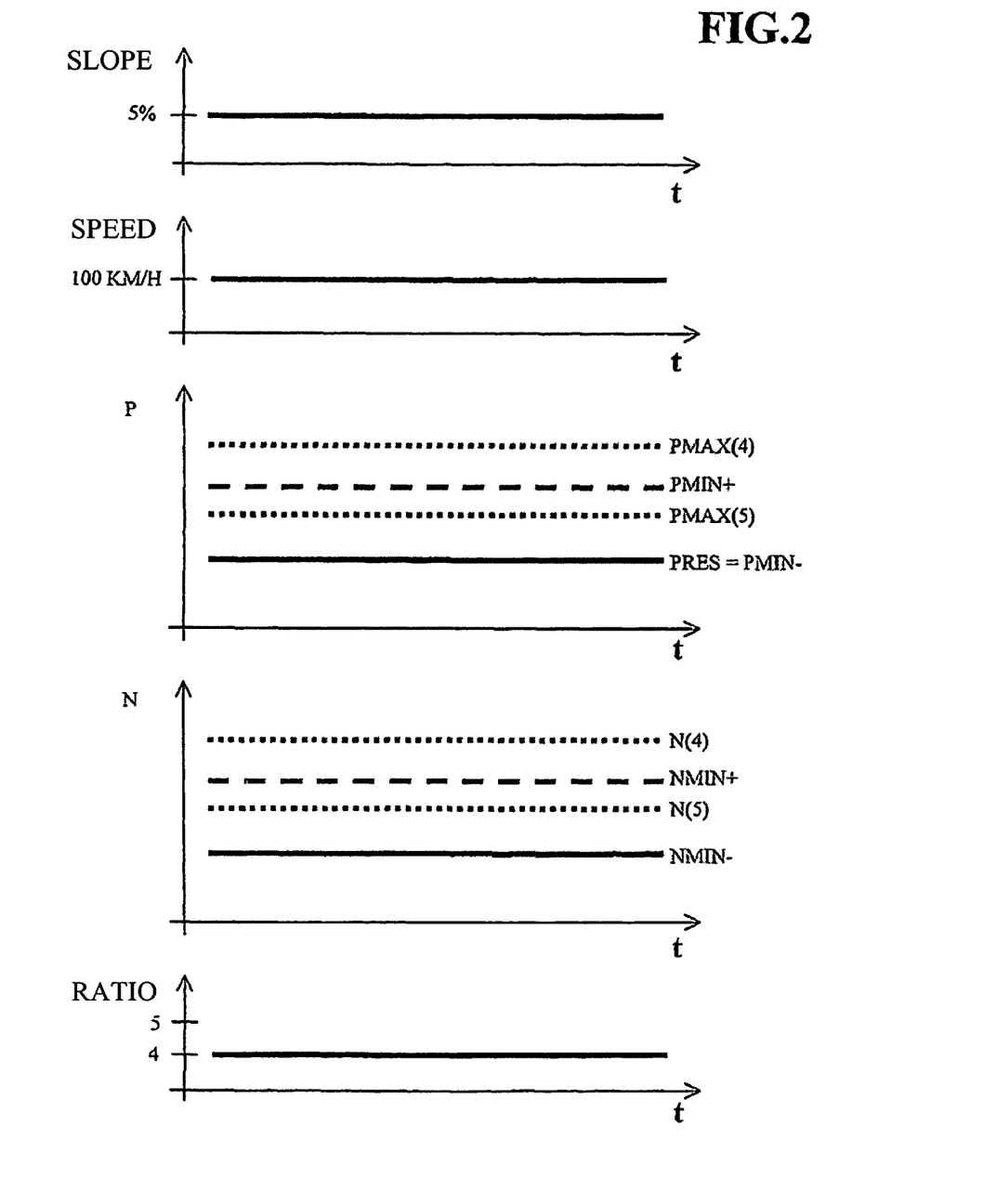
FIG. 2 is a set of graphs illustrating the case of a vehicle equipped with a stepped-ratio transmission traveling at stable speed on an uphill slope.

FIG. 2 illustrates the case of a vehicle traveling on a constant uphill slope (of 5%) at constant speed (100 km/h). The transmission is in the fourth ratio, which permits an availability of the motive power group equal to PMAX(4), greater than PMIN+. If a shift were made to the fifth ratio, the availability of the motive power group would drop to PMAX(5), lower than PMIN+ and therefore insufficient to maintain the vehicle speed. The operator or the governor would increase its setpoint until a downshift to the fourth ratio (initial ratio) took place, and so on: this would be the undesirable phenomenon of ratio hunting.

The graph of evolution of the speeds as a function of time reveals that the speed (N(4)) in fourth ratio is greater than NMIN+, whereas the corresponding speed N(5) in the case of a shift to the fifth ratio is lower than NMIN+. Under these conditions, the shift from the fourth to the fifth ratio is inhibited by application of the selection rules according to the invention, which eliminates the problem of ratio hunting.

Figure 3:
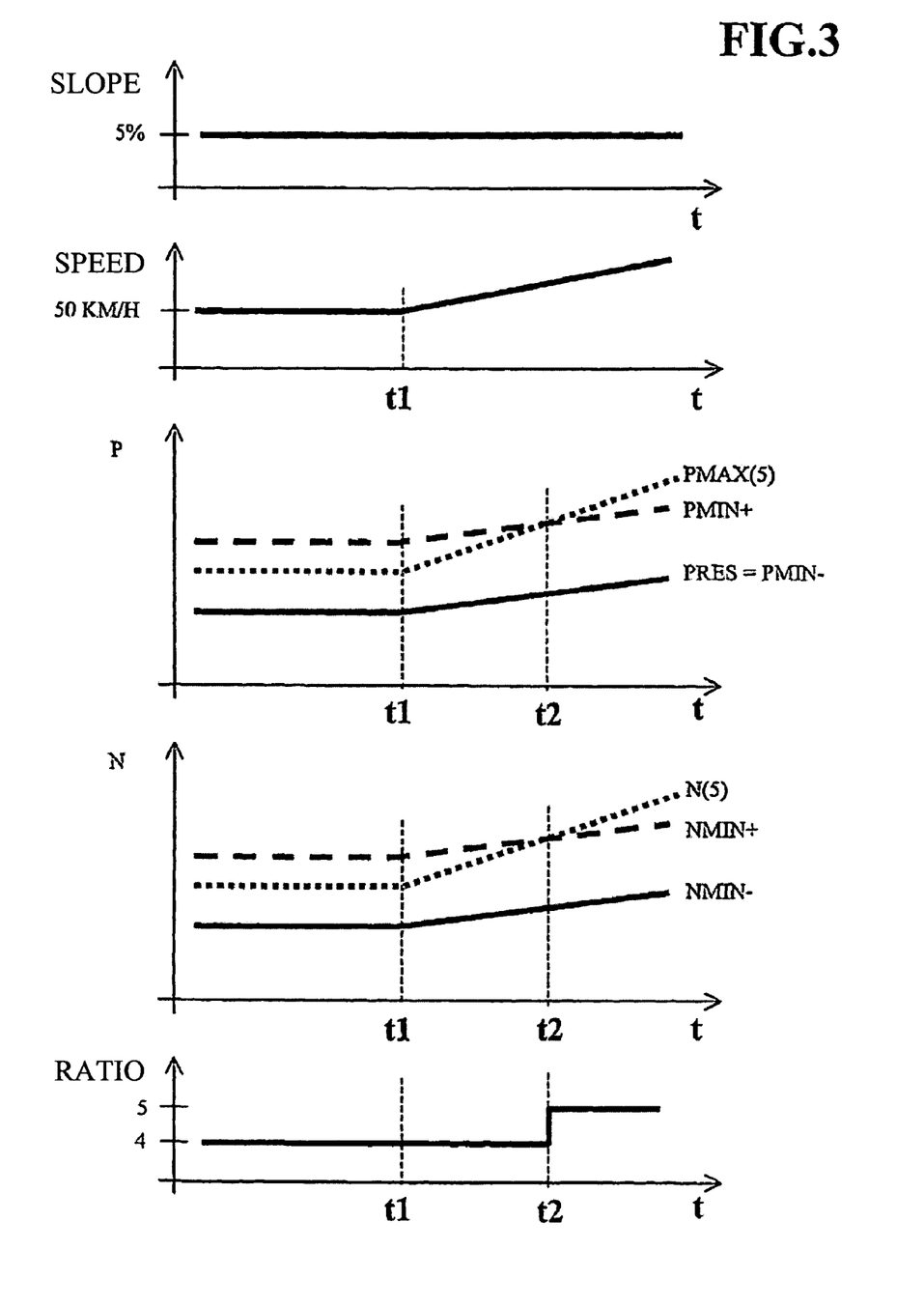
FIG. 3 is similar to FIG. 2, and it illustrates the case of a vehicle whose speed is increasing on a constant uphill slope.

FIG. 3 illustrates the case of a vehicle traveling on a constant uphill slope (of 5%), wherein the vehicle speed, initially fixed at 50 km/h, begins to increase at instant t1. Initially, as in the case of FIG. 2, the selection method according to the invention prevents the shift from the fourth to the fifth ratio, because the engine speed N(5) to which this lengthening of the ratio would lead is lower than the calculated minimum speed NMIN+. Beginning at instant t1, the increase of speed produces not only an increase of the resisting load PRES and therefore of PMIN− and NMIN+ but also an increase of N(5) and of PMAX(5) resulting therefrom. Beginning at a certain speed, PMAX(5) becomes greater than PMIN+, and so NMIN+ calculated by the selection method according to the invention becomes lower than N(5), starting at an instant t2 later than t1, and the upshift to the fifth ratio is authorized.

Figure 4:
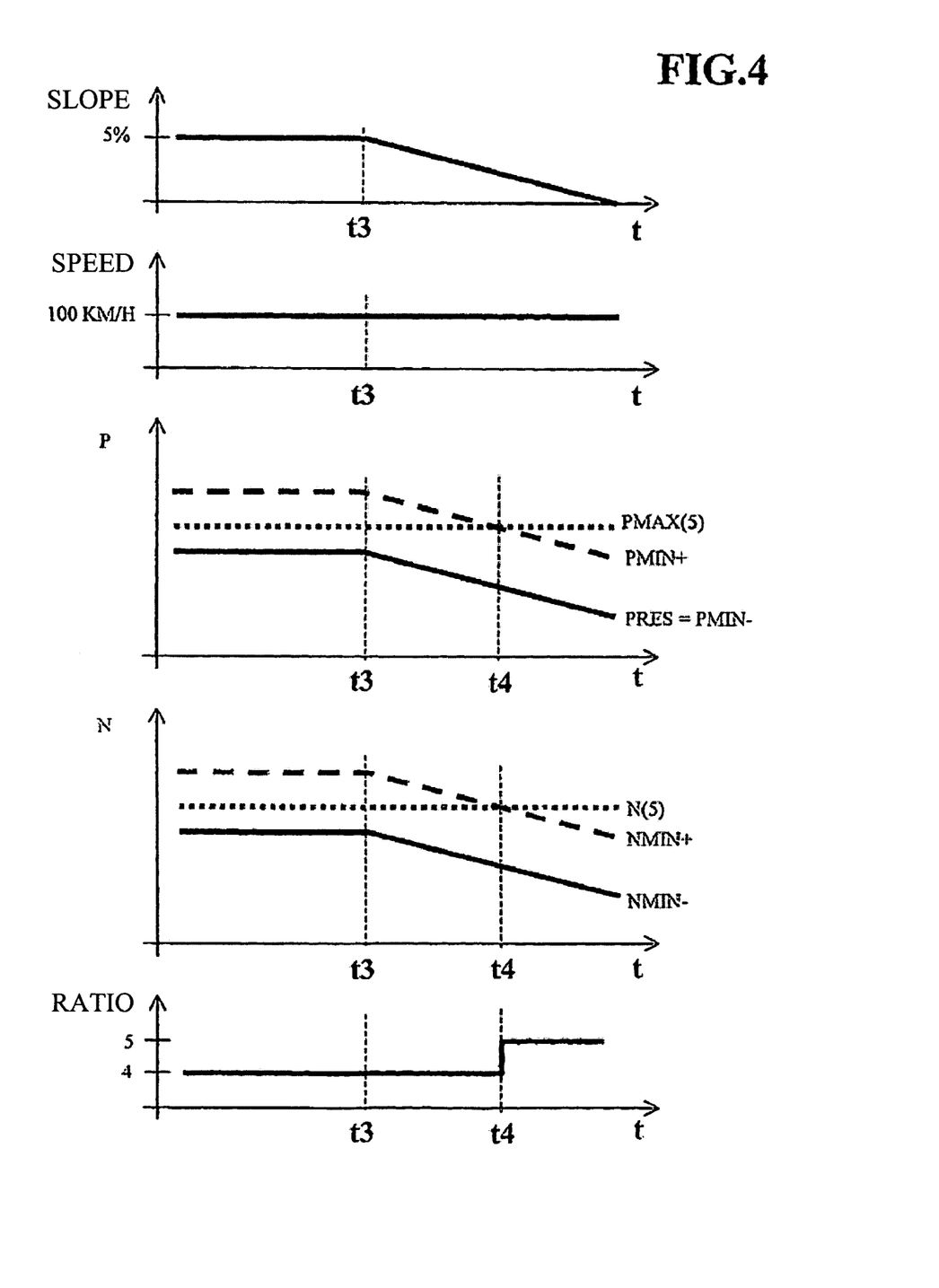
FIG. 4 is similar to FIG. 2, and it illustrates the case of a vehicle traveling at constant speed on a slope of decreasing gradient.

FIG. 4 illustrates the case of a vehicle traveling at constant speed (100 km/h) on an uphill road whose slope, initially constant (at 5%), begins to decrease at instant t3. The transmission is initially in the fourth ratio, but the shift to the fifth ratio is prevented, because it would lead to a speed N(5) lower than NMIN+. As the slope decreases, however, the estimated resisting load PRES decreases, leading to a decrease of PMIN+ and NMIN+. Beginning at instant t4, NMIN+ becomes lower than N(5), and the upshift from the fourth to the fifth ratio is authorized.

Figure 5:
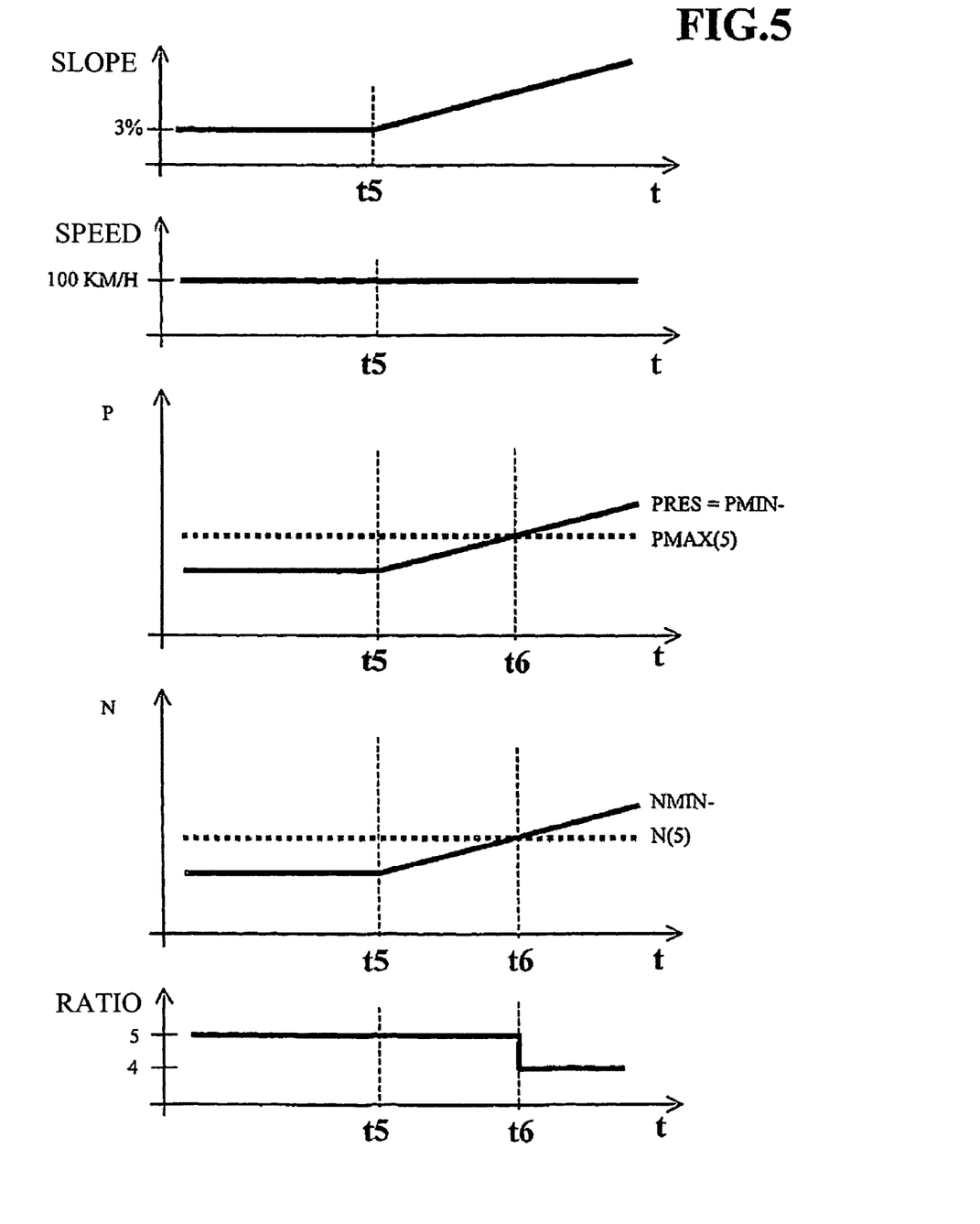
FIG. 5 is similar to FIG. 2, and it illustrates the case of a vehicle traveling at constant speed on a slope of increasing gradient.

FIG. 5 illustrates the case of a vehicle traveling initially on an uphill road, whose slope, initially constant (at 3%), begins to increase at instant t5. Initially in the fifth ratio, which is sufficient to maintain the vehicle at constant speed as long as the slope is 3%, it will be necessary to undertake a downshift in order to maintain the speed of the said vehicle when the slope begins to increase. Since the speed is constant, the engine speed N(5) and the available maximum power PMAX(5) are constant. Beginning at the instant t5, however, the increase of the slope leads to an increase of the resisting load and of its estimate PRES. Because PMIN− is equal to PRES, it becomes higher than PMAX(5) after this increase of PRES, and so the calculated minimum speed NMIN− becomes greater than the current speed N(5) (at instant t6), and a downshift to the fourth ratio is initiated by application of the rules relating to the method according to the invention. The downshift having been initiated before the maximum power PMAX(5) available in the fifth ratio becomes smaller than the resisting load PRES, it is possible to maintain the vehicle at constant speed until instant t6 and, after instant t6, since a downshift has taken place, the motive power group has sufficient power available to maintain the initial speed.

Consequently, the method according to the invention for selecting the transmission ratio made it possible to maintain a perfectly constant vehicle speed, even though the vehicle had been subjected to a substantial increase of the resisting load, necessitating a downshift. This example clearly illustrates the advantage of the method according to the invention in combination with the use of a speed governor: it was not necessary to detect a loss of speed in order to achieve the necessary downshift, since this was sufficiently anticipated. It will also be observed that the same is true if a speed limiter were used, since the current vehicle speed is the maximum setpoint speed. Finally, since the downshift is sufficiently anticipated (upon reaching the saturation point), it does not cause a sudden increase of acceleration and consequently is more comfortable for the vehicle occupants than if it had taken place after detection of a loss of speed. Of course, known techniques for cushioning the downshift can be additionally implemented in order to optimize comfort.

Figure 6:
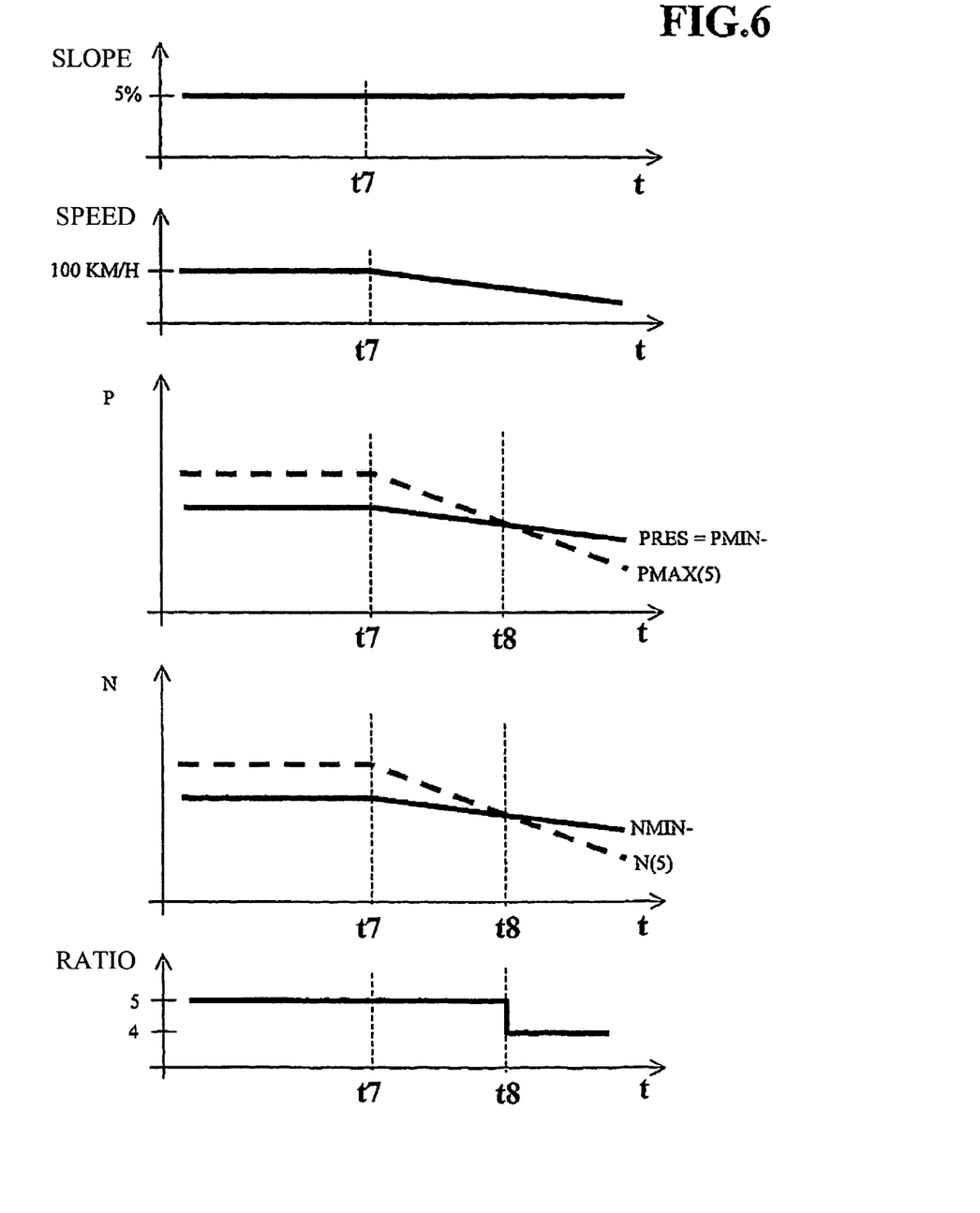
FIG. 6 is similar to FIG. 2, and it illustrates the case of a vehicle whose speed is decreasing on a constant uphill slope.

FIG. 6 illustrates the case of a vehicle at an initially constant speed (100 km/h) on a constant uphill slope, in the fifth ratio. If the vehicle slows down (for example, by decision of the operator to raise his foot from the accelerator), a downshift will become necessary beginning at a certain speed.

The drop of speed (starting at instant t7) produces not only a decrease of the resisting load PRES and therefore of PMIN+ and PMIN− but also a drop of the current speed N(5) and of PMAX(5) resulting therefrom. Below a certain speed, PMAX(5) becomes lower than PRES, the current speed could no longer be maintained in the fifth ratio and a downshift is necessary. Since PMIN− (equal to PRES with ΔP−=0 in the example) becomes higher than PMAX(5), the calculated minimum speed NMIN− becomes higher than the current speed N(5) (at instant t8), and so a downshift to the fourth ratio is initiated in order to respect the selection rules according to the invention. As in the case of FIG. 5, this downshift is initiated before the saturation point is reached, which permits a comfortable downshift.

In the conceivable cases illustrated in the foregoing, the vehicle is subjected to a positive resisting load PRES, reflecting situations in which the vehicle is traveling on an uphill slope. The method according to the invention functions just as well in the case in which the resisting load becomes negative, for example on a downhill slope. If the value of PRES decreases and drops to a negative value, the potential power of the motive power group at the higher ratio necessarily shifts to a value higher than the said resisting load plus a margin. Consequently, lengthening of the ratio will be authorized, as is entirely appropriate for such a situation.

It is easy to verify also that the control method according to the invention remains perfectly compatible with every system for automatic selection of the gear reduction ratio of the transmission that initiates a downshift in the event that the braking effect of the engine is needed, since the said method does not include any condition that inhibits the downshift.

Finally, the control method according to the invention is also compatible with automatic systems for selecting the ratio that autonomously manages the limits of engine speed.

The invention claimed is:

1. A method for controlling selection of a gear reduction ratio of a stepped-ratio or continuously variable automatic transmission for a vehicle, provided with a pilot-control for inhibiting/authorizing lengthening of the gear reduction ratio or for initiating shortening of the gear reduction ratio, the method comprising:

measuring a current engine speed of a vehicle engine;
determining an engine speed that the vehicle engine would have if the gear reduction ratio of the transmission were lengthened, causing the current gear reduction ratio to shift to a higher ratio;

calculating a resisting load exerted on the vehicle, permitting minimum power that must be delivered by a motive power group to maintain a speed setpoint to be determined, including calculating current power being delivered by the motive power group, a mass of the vehicle, and the vehicle's acceleration;

determining a first threshold for a variable representative of a minimum power that must be delivered by the motive power group in the current ratio to maintain the setpoint vehicle speed, the power being increased by a first margin;

determining a second threshold for the variable representative of the minimum power that must be delivered by the motive power group in the higher ratio to maintain the setpoint vehicle speed, the power being increased by a second margin, the first threshold being lower than the second threshold;

demanding shortening of the gear reduction ratio of the transmission if the variable representative of the power that can be delivered by the motive power group at the current speed is lower than the first threshold;

inhibiting lengthening of the gear reduction ratio of the transmission if the variable representative of the power that can be delivered by the motive power group at the determined engine speed is lower than the second threshold; and authorizing shifting from the current ratio to the higher ratio if the variable representative of power that can be delivered by the motive power group at the determined engine speed is higher than the second threshold, wherein, during braking phases, the calculating the resisting load includes determining a value of brake power produced by a brake system, the value being obtained from an information stream representative of brake pressure and a model establishing a correspondence between the brake pressure and the brake power.

2. A method according to claim 1, wherein the powers that can be delivered by the motive power group at the current speed and at the determined engine speed are maximum powers that can be delivered by the motive power group at the speeds under consideration.

3. A method according to claim 1, wherein the variable representative of the powers taken into account for determination of the thresholds and powers that can be delivered by the motive power group is chosen from among power, torque, or longitudinal force.

4. A method according to claim 2, wherein the first threshold and the second threshold are expressed in a form of engine speeds by a modeling permitting establishment of a correspondence between the powers represented by the first and second thresholds and the corresponding engine speeds, the modeling being that of a curve characteristic of the motive power group giving evolution of a variable representative of the maximum power that can be delivered by the motive power group as a function of engine speed, demanding shortening of the gear reduction ratio of the transmission if the current engine speed is below the first threshold, inhibiting lengthening of the gear reduction ratio of the transmission if the engine speed is below the second threshold, and authorizing shifting from the current ratio to the higher ratio if the engine speed is above the second threshold.

5. A method according to claim 1, wherein the mass of the vehicle is determined by a dynamic estimate of the mass of the vehicle.

6. A method according to claim 1, wherein the first and second margins are determined by taking into account the current gear reduction ratio of the transmission and/or a variable representative of the resisting load.

7. A method according to claim 1, wherein
the first margin is equal to zero, and
the second margin is a constant and strictly positive value.

8. A method for controlling selection of a gear reduction ratio according to claim 1, wherein said motive power group includes torque.

9. A method for controlling selection of a gear reduction ratio according to claim 1, wherein said motive power group consists of torque only.

10. A method for controlling selection of a gear reduction ratio according to claim 1, wherein the first and second margins are determined by taking into account the current gear reduction ratio of the transmission and a variable representative of the resisting load.

* * * * *